United States Patent [19]

LeCompte

[11] Patent Number: 4,961,545
[45] Date of Patent: Oct. 9, 1990

[54] DEEP NESTED FILAMENT WINDING

[75] Inventor: George W. LeCompte, Tucson, Ariz.

[73] Assignee: Hughes Aircraft Company, Los Angeles, Calif.

[21] Appl. No.: 307,246

[22] Filed: Feb. 6, 1989

Related U.S. Application Data

[63] Continuation of Ser. No. 69,353, Jul. 2, 1987, abandoned.

[51] Int. Cl.$^5$ .................... B65H 49/02; B65H 55/04; B65H 75/14
[52] U.S. Cl. .................................. 242/54 R; 242/117; 242/118.4; 242/159; 242/174; 242/176
[58] Field of Search ............... 242/159, 172, 173, 174, 242/175, 176, 177, 178, 158 R, 158.4 R, 54 R, 117, 118.4, 157.1, 47, 25 R, 1, 116, 128

[56] References Cited

U.S. PATENT DOCUMENTS

| | | | |
|---|---|---|---|
| 2,639,097 | 5/1953 | Scott, Jr. ........................ | 242/159 X |
| 2,709,553 | 5/1955 | Wellcome ........................ | 242/176 X |
| 2,732,150 | 1/1956 | Le Bus, Sr. ..................... | 242/117 |
| 2,734,695 | 2/1956 | Le Bus, Sr. ..................... | 242/117 |
| 3,114,456 | 12/1963 | Van Billiard ................... | 242/159 X |
| 3,266,423 | 8/1966 | Simpson ........................ | 242/159 X |
| 3,272,454 | 9/1966 | Lane et al. .................... | 242/117 |
| 3,391,443 | 7/1968 | Le Bus, Jr. .................... | 242/117 X |
| 3,399,846 | 9/1968 | Le Bus, Sr. .................... | 242/117 |
| 3,610,549 | 10/1971 | Wennerstrom et al. .......... | 242/176 |
| 3,645,469 | 2/1972 | Fischer et al. ................. | 242/159 X |
| 4,354,645 | 10/1982 | Glavas et al. .................. | 242/117 |
| 4,483,496 | 11/1984 | Weinlich ........................ | 242/158 R |
| 4,743,115 | 5/1988 | Arditty et al. ................. | 242/54 R |

FOREIGN PATENT DOCUMENTS 0207844 1/1987 European Pat. Off. .
3201019 8/1983 Fed. Rep. of Germany .
717497 10/1931 France .

Primary Examiner—Stanley N. Gilreath
Attorney, Agent, or Firm—R. A. Hays; R. M. Heald; W. Denson-Low

[57] ABSTRACT

A deep nested filament winding includes a groove formed in a winding spool. The groove is disposed to provide an overall winding pitch about equal to the diameter of the filament multiplied by the square root of three (3).

6 Claims, 2 Drawing Sheets

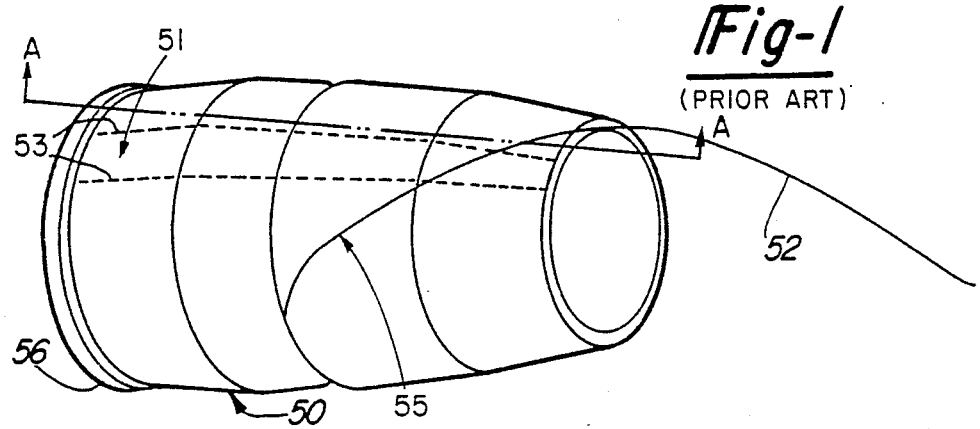
Fig-1 (PRIOR ART)
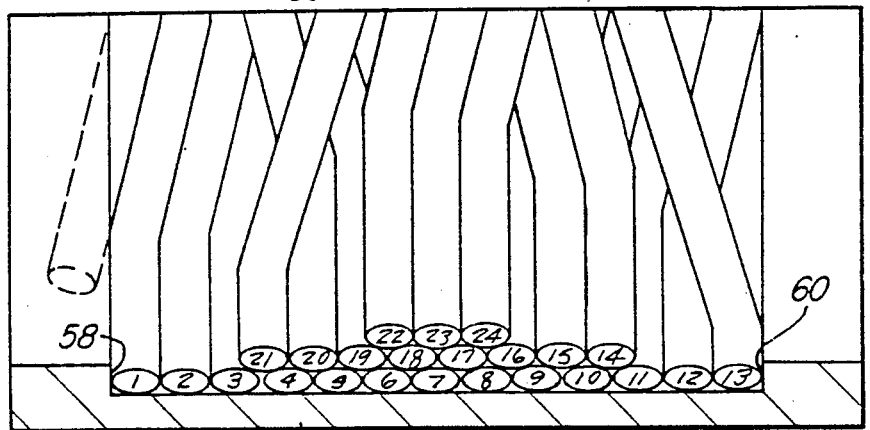
Fig-2 PRIOR ART
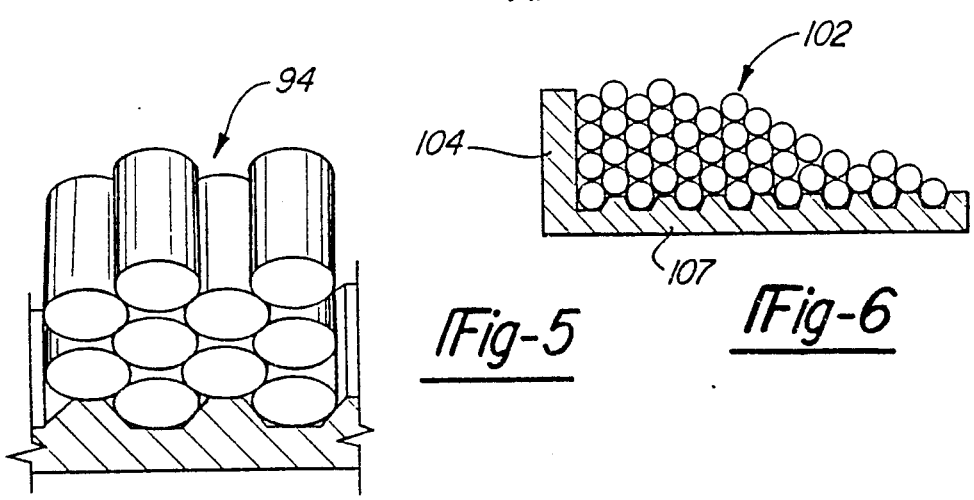
Fig-5
Fig-6

DEEP NESTED FILAMENT WINDING

This application is a continuation of application Ser. No. 069,353, filed July 2, 1987, now abandoned.

BACKGROUND OF THE INVENTION

1. Field of the Invention

This invention relates to a filament winding structure and technique and particularly to one that produces a densely packed and mechanically stable filament winding.

2. Description of Related Art

Many modern weapon systems utilize a launched missile in which guidance information is transferred between it and a firing platform via a data link in the form of an electrical conductor or a fiber optic filament. Present weapon systems employing such techniques include the so-called TOW missile (i.e. Tube launched, Optically tracked, Wire guided missile). In order to provide adequate range for the guided projectile, it is necessary to store a very long length of wire or fiber optic filament within the weapon system. Typically, a winding is provided on a spool which pays out filament at an extremely high rate as the projectile is propelled toward the target.

A number of parameters must be considered in designing a winding of the type used to provide a data link for a guided missile. In order to provide efficient packaging, it is desirable to provide a winding which is dense and compact. Additionally, the winding should be structurally stable to enable it to retain its wound configuration during storage, handling and dispensing, thus eliminating or reducing the necessity of employing adhesives to maintain winding stability. Yet another objective in the design of such windings is to minimize filament payout drag.

Most high speed filament dispensers now in use employ closely spaced precision windings in which each filament turn nests between turns of the previous layer. Because such designs will not maintain regular geometry if wound against a flat radial flange surface, each layer is stepped back several turns at its axial ends from the underlying layer to maintain winding stability. These winding techniques result in tapered winding ends which reduce the volumetric efficiency of the winding. Another disadvantage of some prior art winding techniques is high drag imposed during filament payout since the windings must be displaced in a radially outward direction a significant distance in order to clear other wraps as the filament is withdrawn from the winding.

SUMMARY OF THE INVENTION

An improved filament winding in accordance with this invention provides a filament winding which is volumetrically efficient, mechanically stable, and which features low payout drag. The windings are spaced apart a specific distance which results in layers of the filaments being deeply nested between filaments of the underlying layer of the winding, which provides stability and enables the filament to be wound against a flat radial flange.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a perspective view of a winding in accordance with the prior art;

FIG. 2 is a cross-sectional view, taken along the line A—A of FIG. 1 and viewed obliquely, of a winding in accordance with a first exemplary prior art technique;

FIG. 5 is a partial cross-sectional view of a deep nested filament winding in accordance with a second embodiment of this invention in which the pitch spacing is slightly reduced from that of the embodiment shown in FIG. 4; and FIG. 6 is a cross-sectional view of a deep nested filament winding in accordance with a third embodiment of this invention wherein one axial end of the winding has a staggered configuration.

DETAILED DESCRIPTION OF THE INVENTION

Figure 3:
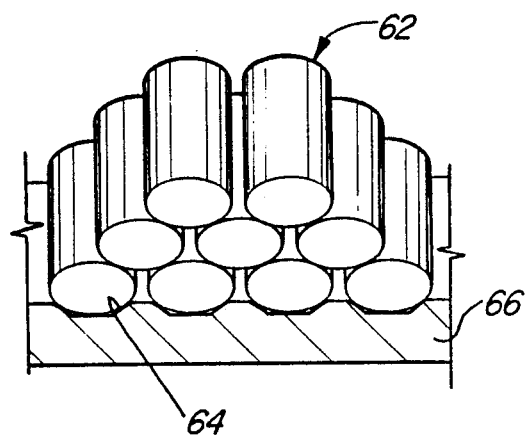
FIG. 3 is a partial cross-sectional view showing a modified construction of the winding shown in FIG. 1 having pitch control grooves.

With particular reference to FIGS. through 3, a precision filament windings according to the prior art will be described. These windings are particularly adapted to enable high speed payout of filament usable in connection with guided missile systems. These techniques are described to better illustrate the differences and advantages of the present invention as compared with the prior art. For several of the windings shown, the cross-sectional views of each of the turns of the filaments are numbered to show the order in which the winding wraps are developed.

FIG. 1 shows the general arrangement of a precision-wound filament dispenser 50 incorporating the prior art. The winding is done on tapered spool 56 to reduce the drag as filament 52 is drawn off over the end of the dispenser, which is rigidly fixed. Because alternate layers must be wound as right-hand and left-hand helixes, filament 52 cannot always remain nested between turns of the preceding layer, but must crossover the underlying filament twice per turn. Maintaining regular crossover geometry is an important element of precision filament winding.

The area 51 in which the crossovers occur is illustrated as the area between dashed lines 53 extending the length of spool 56. The crossovers illustrated in FIG. 2 and FIG. 4 occur in such an area 51 on a typical spool.

FIG. 2 illustrates details of crossovers and layer stepbacks of the precision winding technique in accordance with the prior art. Winding 55 is composed of a number of wraps of filament 52 which are wound upon center post 54 of spool 56. Spool 56 features a pair of radially extending flanges 58 and 60 which define the longitudinal boundaries of winding 55. FIG. 2 shows a portion of winding 55 in a sectioned configuration to better illustrate the manner of winding of filaments 52. The first layer of filaments indicated by wraps numbers 1 through 13 is first laid onto the outer surface of spool 56 and generally defines a helix. As shown in FIG. 2, each of the turns advances a full pitch (distance of axial advancement per turn) in one step for each turn. The first layer of windings begins with turn number 1 and ends with turn number 13, whereupon the axial direction of advancement is reversed to form a second layer comprised of turns 14 through 21. The turns of the second layer also advance the full pitch distance in one step which results in filament 52 of the second layer crossing over turns of the first layer twice for each turn. At turn 21, the direction of advancement of filaments 52 is again reversed, thus forming the third layer comprising wraps 22 through 24. For winding 55, adjacent wraps of filament 52 are placed immediately proximate one another in touching or near touching relationship. This configuration will not maintain regular geometry if wound against a flat, radially extending flange. Consequently, each filament layer is stepped back several turns at its ends from the ends of the preceding filament layer to provide mechanical stability. This prior art technique, therefore, results in inefficient winding packing since it requires a spool having a longer axial length than would otherwise be necessary to store a given length of filament 52.

In operation, filament 52 would be payed out from dispenser 50 in the direction of the arrow in FIG. 2 such that the filament would be unwrapped from spool 56 in a reverse numerical order starting with wrap number 24 and ending at wrap number Besides the poor volumetric efficiency mentioned above, another disadvantage associated with winding 55 is the amount of friction encountered when filament 52 is payed out. The outermost layer comprising turns 22 through 24 can be unwrapped easily; however, the second layer comprising turns 14 through 21 imposes greater drag upon filament payout. Such increased drag is attributable to the fact that each of the turns of the second layer must be displaced in an outward radial direction by an amount equal to its diameter in order to clear the adjacent turn.

FIG. 3 provides a partial cross-sectional view of winding 62 which is substantially identical to winding 55 shown in FIG. 1 except that pitch control grooves 64 are formed within spool 66. Grooves 64 establish the positioning of the base layer of filaments. FIG. 3 further illustrates a pitch spacing which accommodates slight variations in filament diameter by providing small gaps between adjacent filament turns.

Figure 4:
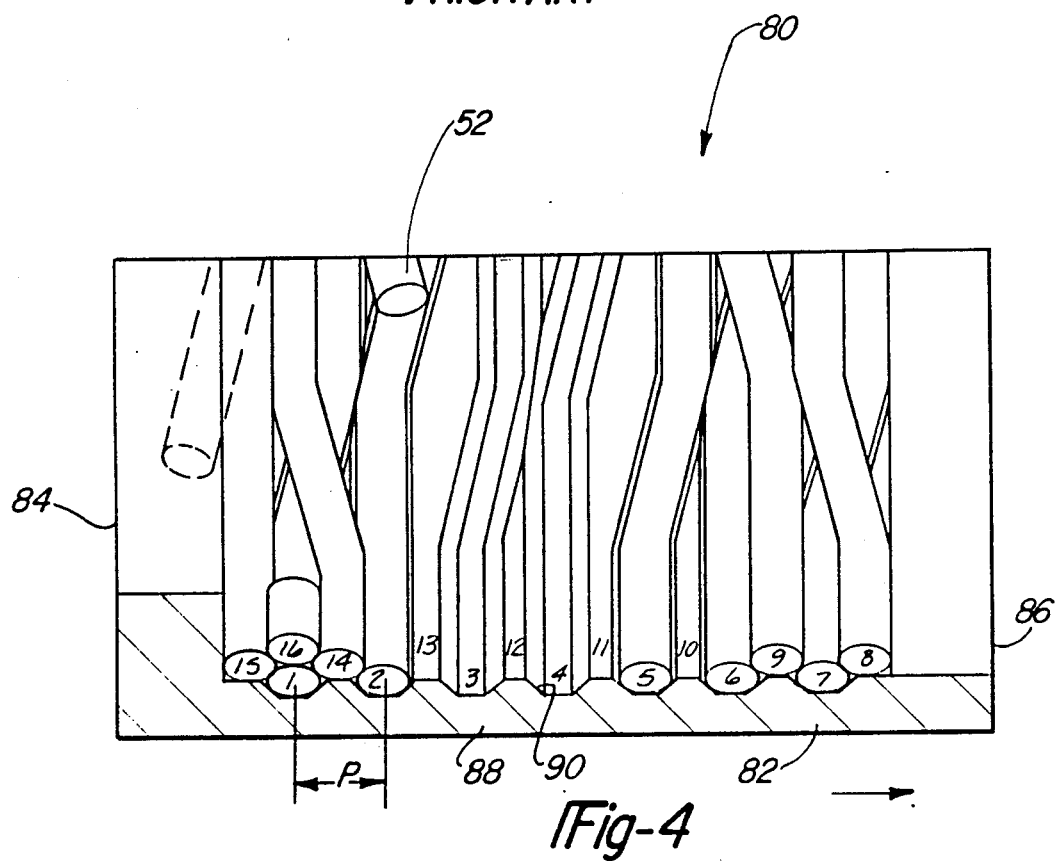
FIG. 4 is a cross-sectional view similar to that shown in FIG. 2 of a deep nested filament winding in accordance with a first embodiment of this invention with a portion therein shown in cross section and a portion shown as a pictorial view.

Now with reference to FIG. 4, winding 80 in accordance with the present invention is shown which is referred to as a "deep nested" winding. To better illustrate the configuration of winding 80, several of the filament wraps are removed. Wrap numbers for the filament wraps removed from FIG. 4 are on the surface touching the associated wrap number. FIG. 4 shows spool 82 with permanent radially extending flange 84 installed at one end of center post 88 and temporary flange 86 located at the opposite end of the center post. Temporary flange 86 is used during filament winding and is later removed to permit filament payout. As shown in FIG. 4, a significant axial spacing is provided between adjacent turns of filament 52. This inventor has found that a pitch spacing, designated by letter "P" in FIG. 4, of about the square root of 3 (i.e. about 1.732) times the diameter of filament 52 provides the desired winding geometry. A pitch distance of slightly less than this ideal spacing may be employed to accommodate minor variations in the diameter of filament 52. When winding filament 52 axially along center post 88, the filament wraps become deeply nested about halfway into the filaments of the underlying layer, thus providing good mechanical stability. This pitch distance also provides a geometry which enables winding against flat end flanges 84 and 86.

Pitch control grooves 90 are provided within center post 88 to establish the configuration of the base filament layer. Several turns of the layers of filaments of winding 80 are removed to better illustrate the interrelationships of the winding turns and layers. Pitch control grooves 90 provide for two steps of axial advancement of filament 52 for each turn of filament around spool 82. In the region of crossover of the second and subsequent layers over filaments of preceding layers, an intentional pairing is provided between adjacent wraps. For example, grooves 90 provided for wrap numbers 3 and 4 are intentionally in touching or near touching relationship when the turns advance axially, whereas a gap is provided between turn numbers 2 and 3, and turn numbers 4 and 5 where these turns advance. This inventor has discovered, quite unexpectedly, that once the pairing relationship is established in the base layer it occurs spontaneously in subsequent layers during automatic winding, thus providing regular winding geometry with minimal control or manual adjustment required to maintain the pairing. Filaments 52 advance axially to the full pitch distance in two equal steps spaced 180° from each other around a periphery of spool 80. Alternatively, however, the positions of the advancement steps may be located at relative positions other than 180°. Once winding 80 is fully developed, adhesives applied during winding or upon completion maintain the winding in the desired configuration when temporary flange 86 is removed.

As the wraps of filament 52 are payed out from winding 80 in the direction of the arrow in FIG. 4, the maximum amount of immediately required displacement of the filament in a radially outward direction is no more than one-half its diameter. This minimal requirement for filament displacement provides acceptable payout drag characteristics.

FIG. 5 illustrates a second embodiment of a winding 94 in which the pitch distance of filament wraps is slightly less than the ideal pitch of the square root of three times the filament diameter. This modified pitch spacing accommodates minor diameter variations in filament 52 yet provides the advantages associated with "deep nesting" the winding.

FIG. 6 illustrates a third embodiment of a deep nested winding according to this invention designated by reference number 102. For this embodiment, only a single wrapping flange 104 is provided, whereas the other axial end of the winding defines a staggered configuration. This design reflects a compromise between packing efficiency and coil stability for a deep nested winding according to this invention. The stepped back turns at one axial end of center post 107 of spool 105 enable the winding to be inherently stable such that the dependance on adhesives can be reduced.

While the above description constitutes the preferred embodiments of the present invention, it will be appreciated that the invention is susceptible to modification, variation and change without departing from the proper scope and fair meaning of the accompanying claims. It should also be recognized that the deep-nesting winding technique can be used in any winding application where dense, regular packing against flanges is desirable. This can include products from small electrical inductors to large cable drums.

What is claimed is:

1. A method of forming a winding of filament comprising the steps of:

providing a spool having a center post and at least a first radially projecting flange, wrapping said filament onto said spool center post such that said filament advances axially with respect to said center post to provide a total pitch distance of approximately 1.732 times the diameter of said filament, said filament advancing axially in a first axial direction with respect to said center post and then reversing to advance in a second axial direction with respect to said center post, said wrapping step continuing by alternately reversing the axial advancement of said filament to define a plurality of filament layers, said layers of said filaments having filament segments which contact said first flange, providing a second radially projecting flange and wrapping said filament onto said spool such that said layers of said filaments have filament segments which contact said second flange, and removing said second flange, thereby enabling said filament to be payed out when pulled axially with respect to said winding.

2. A method of forming a winding of filament according to claim 1 including advancing said filament with respect to said center post in two equal steps to provide said total pitch distance.

3. A method of forming a winding of filament according to claim 2, including forming said steps of equal axial advancement of said filament with respect to said spool center post at positions 180° apart with respect to said spool center post.

4. A method of forming a winding of filament according to claim 1 further comprising the step of coating said filament with an adhesive, thereby enhancing the mechanical stability of said winding.

5. A method of forming a winding of filament according to claim 1 including tapering at least one axial end of said winding by reducing the number of turns of said filament of the layers on said spool as layers are developed in a radially outward direction.

6. A method of forming a winding of filament comprising the steps of:

providing a spool having a center post and at least a first radially projecting flange, wrapping said filament onto said spool center post such that said filament advances axially with respect to said center post to provide a total pitch distance of approximately 1.732 times the diameter of said filament, said filament advancing axially in a first axial direction with respect to said center post and then reversing to advance in a second axial direction with respect to said center post, said wrapping step continuing by alternately reversing the axial advancement of said filament to define a plurality of filament layers, said layers of said filaments having filament segments which contact said first flange, said axial advancement of said filament with respect to said spool center post defines a crossover regions, and wrapping adjacent filament segments in said crossover region and alternatively forcing together and forcing apart said adjacent filament segments to define separated pair of filament segments.

* * * * *